United States Patent [19]

Lacoste

[11] Patent Number: 5,611,132
[45] Date of Patent: Mar. 18, 1997

[54] CHIPPER KNIFE BABBITT REMOVAL TOOL

[76] Inventor: Fernand Lacoste, 208 Fotheringham Avenue, P.O. Box 372, Atikokan, Ontario, Canada, P0T 1C0

[21] Appl. No.: 645,032

[22] Filed: May 13, 1996

Related U.S. Application Data

[63] Continuation of Ser. No. 316,449, Oct. 3, 1994, abandoned.

[51] Int. Cl.⁶ ................................................. B23P 19/04
[52] U.S. Cl. ............................... 29/239; 29/251; 29/252
[58] Field of Search ........................... 29/251, 252, 239, 29/426.5, 412, 415; 83/639, 636, 821, 167

[56] References Cited

U.S. PATENT DOCUMENTS

| | | | |
|---|---|---|---|
| 279,314 | 6/1883 | Arnold et al. | 83/639.1 |
| 2,236,833 | 4/1941 | Pell et al. | 83/639.1 |
| 3,039,343 | 6/1962 | Richards | 83/639.1 |
| 3,707,895 | 1/1973 | McElderry | 83/639.1 |
| 4,106,174 | 8/1978 | Ilines | 29/252 |
| 4,197,795 | 4/1980 | Hawkins | 29/251 |
| 4,754,676 | 7/1988 | Wessels | 83/167 |

FOREIGN PATENT DOCUMENTS

| | | | |
|---|---|---|---|
| 579578 | 10/1924 | France | 83/639.1 |

OTHER PUBLICATIONS

The Encyclopedia Americana International Edition, "Guillotine", p. 580, 1978.

Primary Examiner—Robert C. Watson
Attorney, Agent, or Firm—Murray E. Thrift; Adrian D. Battison

[57] ABSTRACT

A tool is used for removing a block of babbitt material from the back of a chipper knife such as those used in chipping softwood for further processing. The tool has a vertical base with a channel along its front face and a knife support for supporting the knife in the channel with the block of babbitt metal at the back. A blade is driven along the channel using a pneumatic cylinder to impact on the babbitt metal and dislodge it from the knife. A container at the bottom of the channel collects the dislodged babbitt metal.

5 Claims, 2 Drawing Sheets

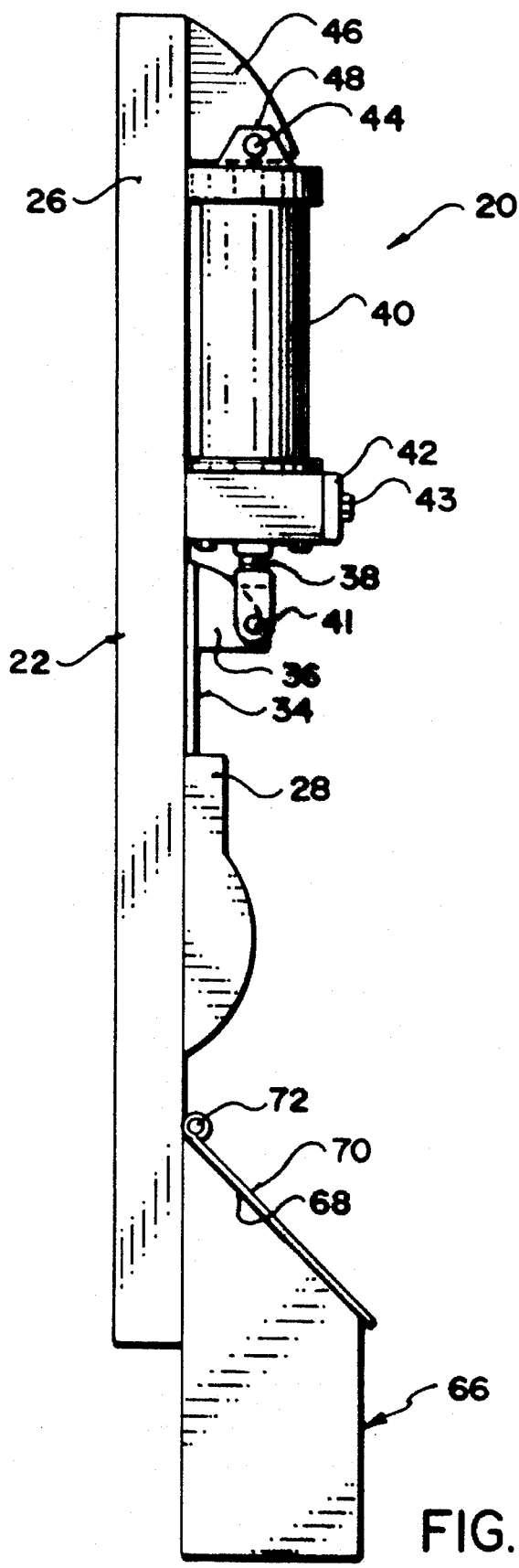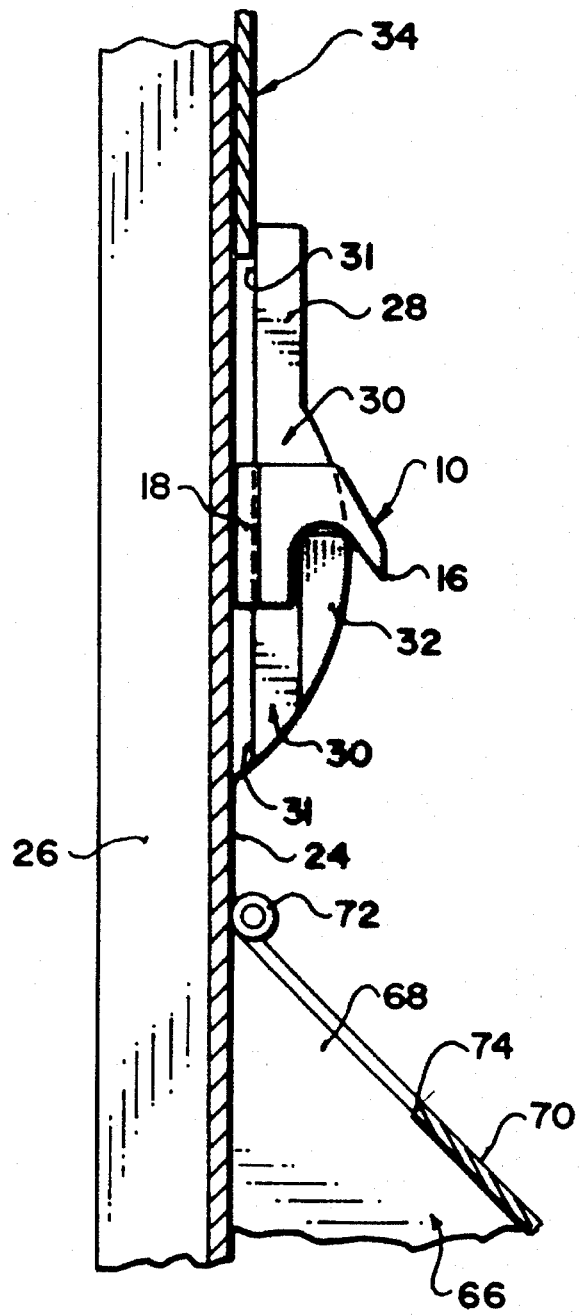
FIG. 3
FIG. 4

CHIPPER KNIFE BABBITT REMOVAL TOOL

This application is a continuation Ser. No. 08/316,449, filed Oct. 3, 1994 now abandoned.

FIELD OF THE INVENTION

The present invention relates to a tool for use in the reconditioning of chipper knives such as those used in chipping softwood for subsequent processing.

BACKGROUND

A chipper knife used for chipping softwood is fixed to its carrier using babbitt metal that is molten when the knife is installed and solidifies as a block on the back of the knife to maintain uniform knife thickness. The knife must occasionally be removed from the carrier for sharpening. To complete this operation, it is necessary to remove the block of babbitt metal from the back of the knife. This is conventionally done manually, using a cold chisel and a hammer, which is time consuming and labour intensive work.

The present invention is concerned with the provision of a tool that will serve to remove the babbitt metal.

SUMMARY

According to the present invention there is provided a tool for removing a block of babbitt metal from a chipper knife, said tool comprising:

a channel;

knife support means for supporting the chipper knife with the block of babbitt material in the channel and for limiting movement of the knife along the channel;

a blade slidable along the channel for engaging the block of babbitt metal therein; and a cylinder secured to the channel and to the blade, the cylinder being actuable to drive the blade along the channel to impact on the block of babbitt metal.

Preferably, the tool includes a receptacle at one end into which the free babbitt metal will fall when removed.

In one exemplary embodiment of the invention, the tool comprises:

a vertical base;

two rails mounted on the base and defining a channel therebetween;

knife support means secured to the rails for limiting the travel of the knife downwardly along the channel;

a blade slideable along the channel for engagement with the top of the block babbitt metal, the blade having a thickness less than the thickness of the block of babbitt metal; and a cylinder mounted on the base above the channel, the cylinder being connected to the base and to the blade and being actuable to drive the blade along the channel into engagement with the block of babbitt metal.

BRIEF DESCRIPTION OF THE DRAWINGS

In the accompanying drawings, which illustrate a chipper knife and an exemplary embodiment of the present invention:

FIG. 3 is a side view of the tool of FIG. 2;

FIG. 4 is a detail of the tool, partially in cross-section, showing a chipper knife in place.

DETAILED DESCRIPTION

Figure 1:
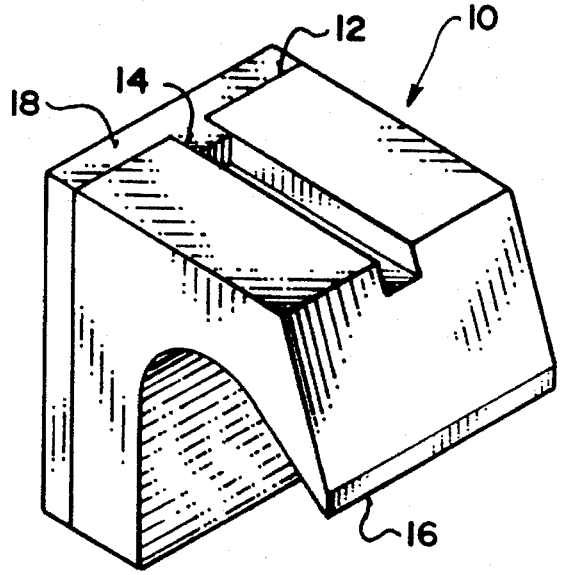
FIG. 1 is an isometric view of a chipper knife.
Figure 5:
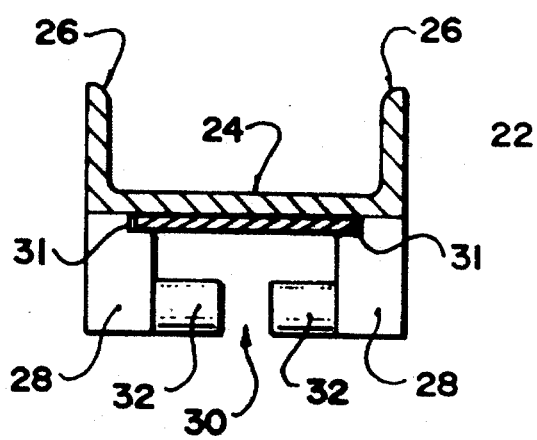
FIG. 5 is a transverse cross-section of the tool along line 5—5 of FIG. 2.
Figure 2:
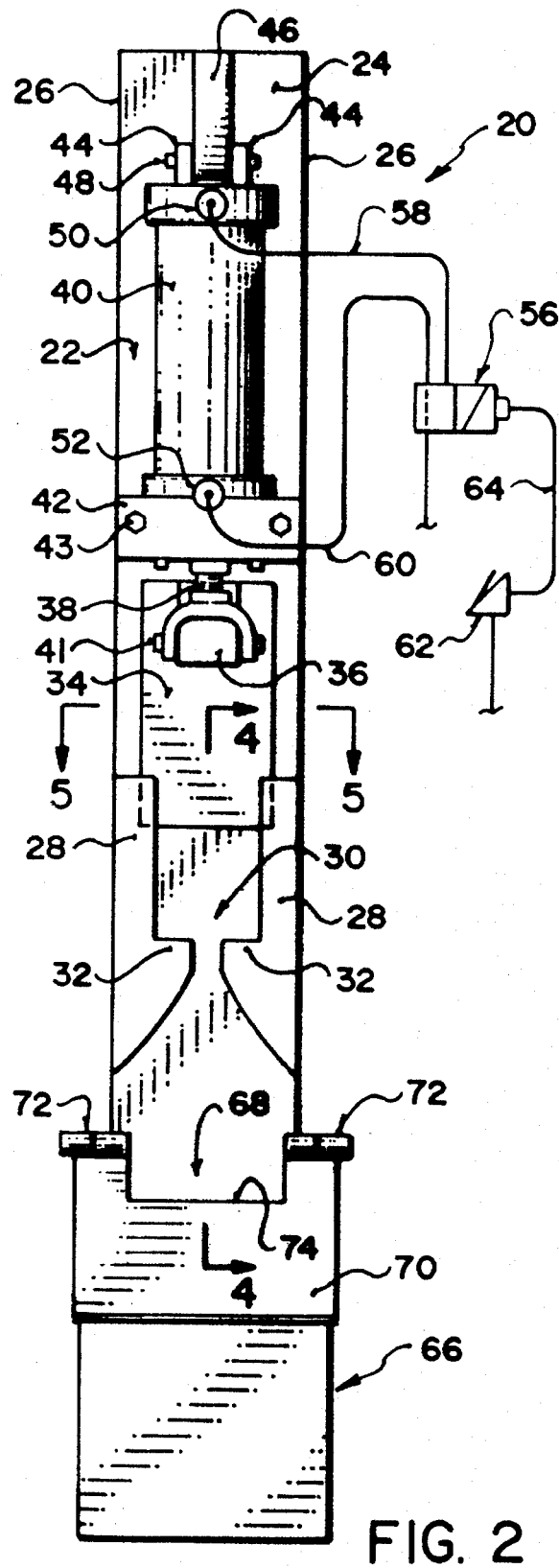
FIG. 2 is a front view of a tool according to the present invention.

Referring to the accompanying drawings, FIG. 1 illustrates a chipper knife 10 with a back face 12. A keyway 14 extends along the center of the back face. At the front of the knife is a blade 16 that requires periodic sharpening. On the back of the knife is a block of babbitt metal 18 that covers the back of the knife and fills the keyway 14. When a blade is to be sharpened, the block of babbitt metal 18 is conventionally removed using a cold chisel and a hammer.

Referring to FIGS. 2 through 5, there is illustrated a tool 20 for removing the babbitt metal block 18 from the knife 10. The tool includes a base 22 in the form of a channel with a web 24 and two flanges 26 projecting to the rear of the tool. In use, the channel is arranged with the web and flanges oriented vertically.

Mounted on the front of the base web 24 are two rails 28. These extend part way along the web, at its opposite edges. The rails define, with the web 24, a channel 30. Along the front face of the web, each rail has a groove 31 in its inner face, confronting the groove in the other rail.

Adjacent at their bottom ends, the two rails carry knife supports 32 which are located in front of the channel 30 and project towards one another across the front of the channel 30.

A rectangular blade 34 slides along the channel 30, in the two grooves 31. Near its upper end, on its front face, the blade carries a lug 36. This is pinned to the piston rod 38 of a pneumatic cylinder 40 by a pin 41. The cylinder is fastened to the base 22 by a clamp plate 42 and two bolts 43. The end of the cylinder has two lugs 44 that are pinned to a lug 46 on the base by a cross-pin 48.

The cylinder and rod end ports 50 and 52 respectively of the cylinder 44 are connected to a control valve 56 by two air lines 58 and 60. A pedal operated actuator 62 is connected to the control valve by an air line 64 for controlling the delivery of air to the cylinder.

At the bottom end of the base 22 is a container 66 with an open top end 68 and a cover 70 that slopes downwardly to the front, over the open top. The cover is connected to the container by two hinges 72 at opposite sides of the base. Between the two hinges the cover 70 has a rectangular slot 74 positioned directly below the channel 30.

In use, a knife is supported in the channel by the knife supports 32, as shown most particularly in FIG. 3. The babbitt metal block 18 rests against the front face of the base web 24 and the knife supports engage in the cavity under the blade 16. When the cylinder is actuated, it drives the blade 34 downwardly along the channel to impact on the babbitt metal block and to drive it off the knife. The separated babbitt metal falls from the channel, through the slot 74 into the container 66 at the bottom end of the tool.

Use of this tool has been found to provide a considerable reduction in the amount of time and labour involved in sharpening a set of chipper knives.

While one embodiment of the present invention has been described of the foregoing, it is to be understood that other embodiments are possible within the scope of the invention and are intended to be included herein. The invention is to be considered limited solely by the accompanying claims.

I claim:

1. A tool for removing a block of babbitt metal from a chipper knife, said tool comprising:

a channel comprising two spaced apart rails and having an open front side;

knife support means extending at least partially across the open front side of the channel, between the rails for supporting the chipper knife with the block of babbitt material in the channel and for limiting movement of the knife along the channel;

a blade slidable along the channel for engaging the block of babbitt metal therein, the blade being spaced rearwardly from the knife support means; and a cylinder secured to the channel and to the blade, the cylinder being actuable to drive the blade along the channel to impact on the block of babbitt metal.

2. A tool according to claim 1 including a receiver container for receiving babbitt metal separated from the chipper knife.

3. A tool according to claim 1 wherein:

the tool comprises a base;

the channel comprises the two rails spaced apart on the base;

the knife support comprises two members projecting towards one another, across the channel from the respective rails.

4. A tool for removing a block of babbitt metal from a clipper knife, said tool comprising:

a vertical base;

two vertical rails mounted on the base and projecting to a front side of the base, the rails being spaced apart to define a channel therebetween;

knife support means secured to the rails and extending into the channel at a position spaced from the base for limiting the travel of the knife downwardly along the channel;

a blade slideable along the channel between the base and the knife support means, and spaced from the knife support means for engagement with the top of the block babbitt metal, the blade having a thickness less than the thickness of the block of babbitt metal; and a cylinder mounted on the base above the channel, the cylinder being connected to the base and to the blade and being actuable to drive the blade along the channel into engagement with the block of babbitt metal.

5. A tool according to plan 4 including a container mounted on the base below the channel for receiving the babbitt metal.

* * * * *